Nov. 17, 1925.
S. G. DOWN
BRAKE SHOE CONSTRUCTION
Filed Nov. 1, 1923
1,561,700
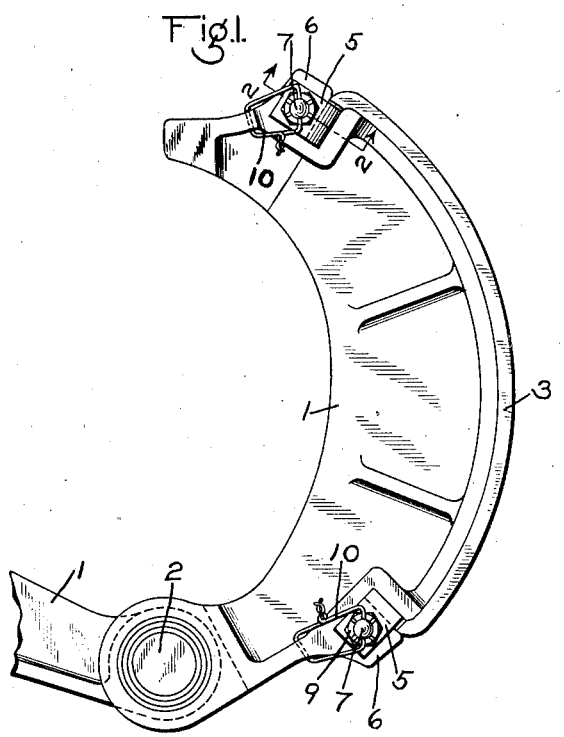
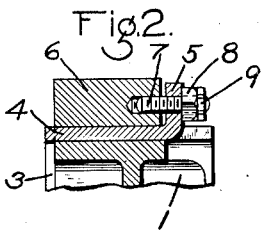
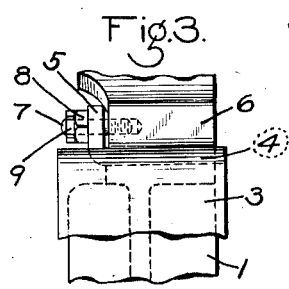
INVENTOR
SIDNEY G. DOWN
BY *Wm. M. Cady*
ATTORNEY Patented Nov. 17, 1925.

1,561,700

UNITED STATES PATENT OFFICE.

SIDNEY G. DOWN, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

BRAKE-SHOE CONSTRUCTION.

Application filed November 1, 1923. Serial No. 672,117.

*To all whom it may concern:*

Be it known that I, SIDNEY G. DOWN, a citizen of the United States, residing at Pittsburgh, in the county of Allegheny and State of Pennsylvania, have invented new and useful Improvements in Brake-Shoe Constructions, of which the following is a specification.

This invention relates to brake shoes, and more particularly to a brake shoe construction of the internal expanding drum type, such as employed on motor vehicles.

The principal object of my invention is to provide an improved brake shoe construction of the above character.

In the accompanying drawing; Fig. 1 is an elevational view of a brake head showing my improved brake shoe construction applied thereto; Fig. 2 a section on the line 2—2 of Fig. 1; and Fig. 3 a plan view of one of the end portions of the brake head and brake shoe.

The brake head 1 is of the usual internal expanding type having a pivot pin 2 connecting opposite brake heads and having an arcuate face for receiving a brake shoe head. The brake heads 1 are adapted to be expanded by the usual cam member (not shown) so as to bring the brake shoes 3 into frictional engagement with the internal friction face of a brake drum (not shown).

According to my invention, each brake shoe 3 comprises a metallic plate bent to conform to the arcuate face of the brake head 1. Each end of the brake shoe 3 is bent inwardly to form a flange 4 and at one side, said flange is cut transversely to permit a portion of the flange to be bent outwardly, at right angles to the flange, so as to form a lug 5. At opposite ends of the arcuate face, the break head 1 is provided with a thickened transverse portion 6 which is adapted to aline with the lug 5 and is provided with a transverse slot for receiving the flange 4, said portion being tapped for a stud 7.

A hole is drilled in each lug 5 to aline with the stud 7 and the brake shoe 3 is applied by an axial movement thereof relative to the brake head so that the flange 4 at each end engages the transverse slot in the head. When the brake shoe is properly positioned on the brake head, with the studs 7 engaging the openings in the lugs 5, a nut 8 is applied to each stud and is screwed tight, to hold the brake shoe securely in place. A jam nut 9 may also be applied and may be held against turning by a wire 10.

It will be evident that with this construction the brake shoe may be applied or removed without removing the vehicle wheel.

Having now described my invention, what I claim as new and desire to secure by Letters Patent, is:—

1. The combination with a brake head having an arcuate face and a transverse slot at each end of the arcuate face, of a brake shoe dapted to engage said arcuate face and having a flange at each end adapted to engage a corresponding slot in the brake head, a lug formed from each flange and extending outwardly at right angles to the flange, and means for securing each lug to the brake head.

2. The combination with a brake head having an arcuate face and a thickened portion at each end of the arcuate face with a transverse slot between said thickened portion and the body of the brake head, of a brake shoe engaging said arcuate face and having an inwardly turned flange at each end engaging in the corresponding transverse slot in the brake head, a lug formed from each flange, and a stud secured in each thickened portion of the shoe and adapted to engage in an opening in the corresponding lug.

In testimony whereof I have hereunto set my hand.

SIDNEY G. DOWN.